US012382233B2

(12) United States Patent
Böhmer

(10) Patent No.: US 12,382,233 B2
(45) Date of Patent: Aug. 5, 2025

(54) SOUND REPRODUCTION WITH MULTIPLE ORDER HRTF BETWEEN LEFT AND RIGHT EARS

(71) Applicant: INNIT AUDIO AB

(72) Inventor: Bernt Böhmer, Bjärred (SE)

(73) Assignee: INNIT AUDIO AB, Lund (SE)

( * ) Notice: Subject to any disclaimer, the term of this patent is extended or adjusted under 35 U.S.C. 154(b) by 186 days.

(21) Appl. No.: 18/029,956

(22) PCT Filed: Oct. 14, 2021

(86) PCT No.: PCT/SE2021/051005
§ 371 (c)(1),
(2) Date: Apr. 3, 2023

(87) PCT Pub. No.: WO2022/086393
PCT Pub. Date: Apr. 28, 2022

(65) Prior Publication Data

US 2023/0370797 A1 Nov. 16, 2023

(30) Foreign Application Priority Data

Oct. 19, 2020 (SE) .................................... 2051210-9

(51) Int. Cl.
*H04S 1/00* (2006.01)

(52) U.S. Cl.
CPC .......... *H04S 1/007* (2013.01); *H04S 2420/01* (2013.01)

(58) Field of Classification Search
CPC ............................ H04S 1/007; H04S 2420/01
See application file for complete search history.

(56) References Cited

U.S. PATENT DOCUMENTS 5,717,767 A * 2/1998 Inanaga .................. H04S 7/304 381/74
5,742,689 A * 4/1998 Tucker ...................... H04S 7/30 381/17

(Continued)

FOREIGN PATENT DOCUMENTS

| | | | |
|---|---|---|---|
| WO | WO-94/23406 | A1 | 10/1994 |
| WO | WO-2009/111798 | A2 | 9/2009 |
| WO | WO-2019/055572 | A1 | 3/2019 |

OTHER PUBLICATIONS

Swedish Search Report for Application No. 2051210-9 dated Jun. 1, 2021.

(Continued)

*Primary Examiner* — David L Ton
(74) *Attorney, Agent, or Firm* — MOSER TABOADA

(57) ABSTRACT

To locate sound sources in space so called Head Related Transfer Functions (HRTF) are commonly applied. Typically, Head Related Frequency Responses (HRFRs) for hundreds of individuals are averaged to produce average HRFR for each location. The averaged HRFR data is then used for location coding of audio sources in recordings and playback. The presented invention solves the location coding by breaking down the localization process in a novel manner introducing a new time domain focused approach. The approach is called Multiple Order HRTF according to the present invention. The approach allows averaging across individuals and with its time domain coding provides more stable localization of sound sources that is clearly positioned outside of the listener's head through headphones. It is also possible to create virtual surround sound sources around a listening room using only two stereo speakers by embedding coded position information into the direct sound from the stereo speaker pair.

13 Claims, 3 Drawing Sheets

(56) References Cited

U.S. PATENT DOCUMENTS

| | | | | |
|---|---|---|---|---|
| 8,204,262 | B2 * | 6/2012 | Aoyagi | H04S 1/005 381/74 |
| 8,638,959 | B1 | 1/2014 | Hall | |
| 8,885,834 | B2 * | 11/2014 | Kuhr | H04S 7/304 381/61 |
| 9,332,372 | B2 * | 5/2016 | Meyer | H04S 7/304 |
| 9,918,178 | B2 | 3/2018 | Norris et al. | |
| 10,565,975 | B2 * | 2/2020 | Woelfl | G10K 1/38 |
| 11,122,384 | B2 * | 9/2021 | Yadegari | H04S 3/008 |
| 11,304,020 | B2 * | 4/2022 | Jot | H04S 3/002 |
| 11,451,907 | B2 * | 9/2022 | Milne | H04S 7/301 |
| 11,665,498 | B2 * | 5/2023 | Thompson | H04S 7/303 381/303 |
| 12,183,351 | B2 * | 12/2024 | Breebaart | H04S 1/007 |
| 2005/0089181 | A1 | 4/2005 | Polk, Jr. et al. | |
| 2007/0127730 | A1 | 6/2007 | Kim et al. | |
| 2008/0031462 | A1 | 2/2008 | Walsh et al. | |
| 2011/0299707 | A1 | 12/2011 | Meyer | |
| 2019/0082283 | A1 | 3/2019 | Riggs et al. | |
| 2019/0246230 | A1 | 8/2019 | Wardle et al. | |
| 2020/0037097 | A1 | 1/2020 | Torres et al. | |

OTHER PUBLICATIONS

International Search Report for Application No. PCT/SE2021/051005 dated Nov. 23, 2021.

* cited by examiner

SOUND REPRODUCTION WITH MULTIPLE ORDER HRTF BETWEEN LEFT AND RIGHT EARS

INTRODUCTION

It has been a long-time objective in the audio industry to increase listener engagement and immersion in recorded and subsequently reproduced sound. This quest was very much alive already in 1931 when Alan Blumlein invented stereo. Over the years sound quality and consequently immersion has gradually improved. Although various forms of surround sound were present earlier, in the seventies Dolby introduced Dolby Stereo which despite its name was the first commercially successful surround sound format. Surround Sound provided a higher level of immersion than previously attainable. In recent years object-based audio formats like Dolby Atmos and Sony 360 have emerged, increasing the level of immersion even further.

One of the major challenges connected to all surround formats is the reproduction of the surround sound field. Although a Dolby Atmos commercial theater with hundreds of speakers located around the cinema room can sound very impressive it is not practical to replicate such a setup in a private home. The industry has also struggled to create a convincing replication of a surround sound field over headphones. Despite considerable research efforts, the present-day technologies do not manage to produce a sound field that is perceived to be significantly outside of a listener's head with headphones. The sound is typically felt to be mostly inside the head and not surrounding the listener as intended. Furthermore, the small amount of sound outside of the listener's head is predominantly positioned to the immediate left and right of the listener's ears or slightly behind. It is not possible to provide a stable front hemisphere location which is obviously very desirable.

To locate sound sources in space so called Head Related Transfer Functions (HRTF) are commonly applied. Surround sound produced for movies, video games etc. and many stereo recordings contain HRTF coding of sound. HRTF coding of location is present both in surround sound and stereo recordings and is suitable for both loudspeaker and headphone playback. Several playback algorithms, such as Dolby Atmos for headphones, also employ HRTF coding to locate sound.

Several HRTF databases containing measurements from hundreds of test subjects have been published on the web by the research community and are available for download. The databases typically contain frequency responses, Head Related Frequency Response (HRFR), associated with multiple locations around each test subject. Some databases also include the associated time domain response called Head Related Impulse Response (HRIR).

Typically, HRFR responses for hundreds of individuals are averaged to produce average HRFR for each location. The averaged HRFR data is then used for location coding of audio sources in recordings and playback.

As discussed earlier, this type of average HRFR coding does not produce convincing results over headphones and it requires a multitude of speakers spread around a room. Despite the averaging of measurements across many test subjects the perceived location also changes significantly from individual to individual.

Successful results are however achievable using individually measured HRIR for each listener. Convolving playback material with the individual HRIR using an ordinary FIR filter can create a fully realistic immersion in surround sound through headphones but only for the person whose personal HRIR is used during playback convolution. Producing individual HRIR data for everyone that is going to listen to a recoding is clearly not possible. Several attempts have been made to customize the commonly used average HRFR data from information about personal physical properties provided by the individual, but none have provided any breakthrough.

With HRIR the latency in the FIR filter also becomes a problem. For good results, the HRIR must be rather long and the latency introduced will cause significant problems in virtual reality, gaming and other similar applications where significant latency is unacceptable.

A successful straight forward averaging approach like HRFR averaging is also not possible in the time domain. FIG. 1 illustrates the difficulty of time domain HRIR averaging. Traces 1, 2 and 3 in FIG. 1 show HRIR data from three different test subjects. Due to different physical sizes, and associated sound wave travel times, the second bumps in the HRIR data occurs at different points in time in relation to the larger first arrival to the left on the traces. Trace 4 illustrates an average of 1, 2 and 3. Clearly this is not a good average from the three physically different test subjects. Trace 2 would be the best average between the individuals' sizes in this example but trace 4 does not look at all like trace 2. The three individual bumps on traces 1-3 have been smeared out in time. Instead of a clear wave front arrival at the average point in time, trace 2, the wave front has been time smeared and suppressed which is not the desired outcome.

The presented invention solves the location coding by breaking down the localization process in a novel manner introducing a new time domain focused approach. The approach is called Multiple Order HRTF. The approach allows averaging across individuals and with its time domain coding provides more stable localization of audio sources that is clearly positioned outside and in front, if desired, of the listener's head through headphones. It is also possible to create virtual surround sound sources around a listening room using only two stereo speakers by embedding coded position information into the direct sound from the stereo speaker pair.

SUMMARY OF THE PRESENT INVENTION

The present invention is directed to a method for sound reproduction, said method comprising location coding with multiple order head related transfer functions (HRTF), wherein the method involves sound reproduction with at least a first order HRTF to the left ear and then a second order HRTF from the left ear to the right ear, and at the same time a first order HRTF to the right ear and then a second order HRTF from the right ear to the left ear. In relation to the above it should be mentioned that "multiple order" may imply second order, third order or up to any level of order. In relation to this it may also be mentioned that according to one embodiment, the method involves at least a third order HRTF going from the left ear to the right ear in the same way as from the right ear to the left ear, preferably at least a fourth order HRTF going from the left ear to the right ear in the same way as from the right ear to the left ear.

Furthermore, the concept according to the present invention is further described below and in relation to the figures, especially in relation to FIG. 2.

Moreover, in relation to the present invention it should be mentioned that there are many known methods using several/multiple HRTFs, e.g. as disclosed in US2020/0037097, however this is not the same concept as disclosed and provided by the present invention. Again, the present invention provides a method comprising sound reproduction with at least a first order HRTF to the left ear and then a second order HRTF from the left ear to the right ear, and at the same time a first order HRTF to the right ear and then a second order HRTF from the right ear to the left ear. This should not be confused with using several/multiple HRTFs, which is utilized in many known methods.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
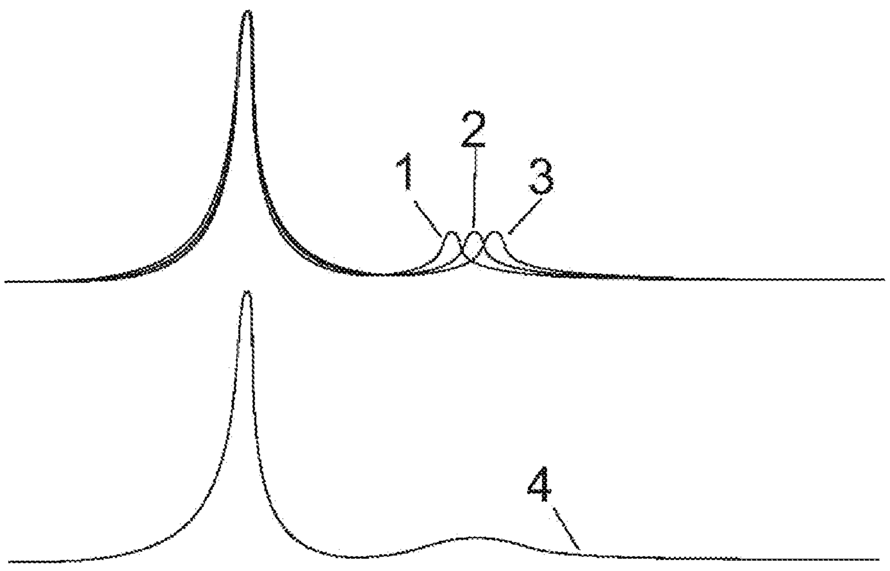
FIG. 1 illustrates HRIR data from three different test subjects.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION OF MULTIPLE ORDER HRTF

It is well known from psycho acoustic research that human hearing is extremely sensitive to time domain properties of sounds. The sonic difference between wood and metal is heard in the first few milliseconds after a knock on the material. The startup waveforms of a violin and trumpet note are quite dissimilar and the difference is easily heard. However, if the sustained note from each instrument is heard without the startup it becomes difficult to differentiate between the two.

In the same manner sound source location is interpreted not only by HRFR but also from time domain information. Preceding localization solutions have focused on average HRFR data ignoring time domain information due to the discussed difficulties. The results have been less convincing. Individual HRIR data captures the time domain information but only for one individual at a time and manages to provide a good surround sound field impression for the individual in question.

Figure 2:
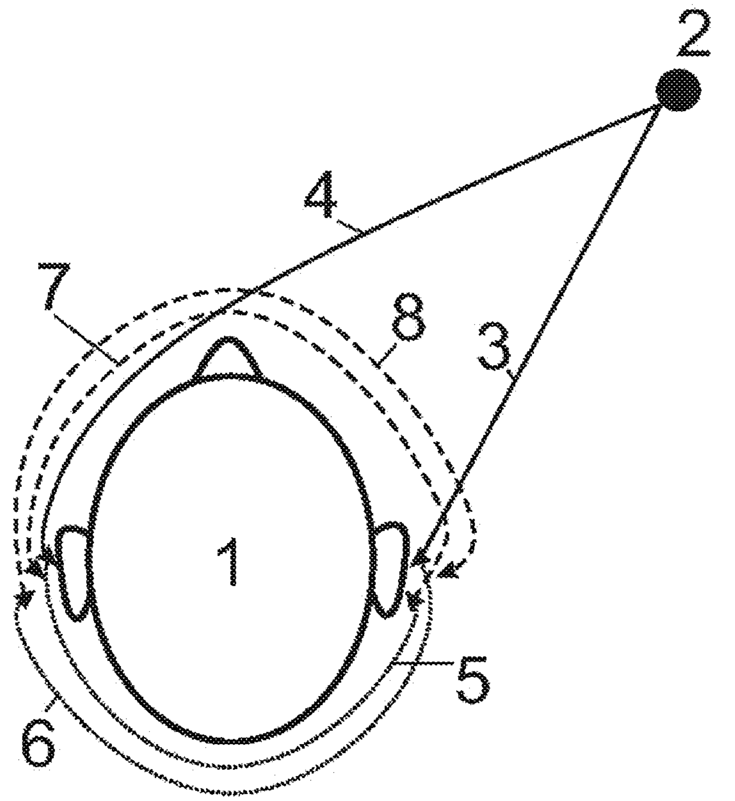
FIG. 2 illustrates sound paths from a sound source to and around a listener's head.

FIG. 2 illustrates sound paths from a sound source to and around a listener's head. Number 1 is the listener, 2 the sound source and 3 to 8 are visualized sound wave paths to and around the head. FIG. 2 only illustrates one sound source location but any location in three-dimensional space has got a similar set of imaginable sound paths associated with it. FIG. 2 shows the general principle and paths for other sound source locations should be easy to extrapolate.

Each sound path 3 to 8 have a time delay, a frequency response and attenuation associated with it. Path 3 has a time delay, the travel time of sound from the sound source 2 to the right ear but in this special case, since this is the first arrival of sound to the listener, the delay is zero as there is no need to have a delay that parallels the sound travel time to reach the listener. Attenuation in this specific first order path is also zero since the sound travels directly to the ear without any obstacles that can produce attenuation. The frequency response would typically be the well know average HRFR for the source location for the right ear. The sound wave will however not stop when it has reached the right ear. It will continue along the path 6 around the head to the left ear. This path has an interaural time delay due to sound travel time, a frequency response due to the shadowing of higher frequencies by the head etc. and attenuation caused by the travel around the head to the other ear. This second wave path is the second order HRTF. When the sound wave has reached the left ear, it will again continue to travel along the path 8 back to the right ear and once more this path has a time delay, a frequency response and attenuation associated with it. This is the third order HRTF. For reasons of clarity FIG. 2 does not illustrate higher order HRTF, but the principle should now be obvious and it is easy to extrapolate any higher order HRTF by just continuing with the paths around the head.

The time delays associated with the paths between the ears are directly tied to the physical distance between the ears and in the order of 200 us to 1 ms, typically about 600 μs. Frequency response alteration caused by the head when sound waves travel across it from one ear to the other is in general a down shelving of the higher frequency spectra beginning at 400 Hz to 2.5 kHz and continuing all the way up to the limit of human hearing at 20 KHz and above. A few dips and peaks related to the specific path will also be present due to the physical properties of the human head and shoulders. Attenuation typically varies from 0-6 dB in the first order path, 3-12 dB in the second, 6-24 dB in the third and 9-48 dB in the fourth. The methodology and techniques involved in obtaining the exact time delays and attenuations associated with each path should be straight forward for someone skilled in the art using standard methods and it is therefore not further discussed.

Figure 3:
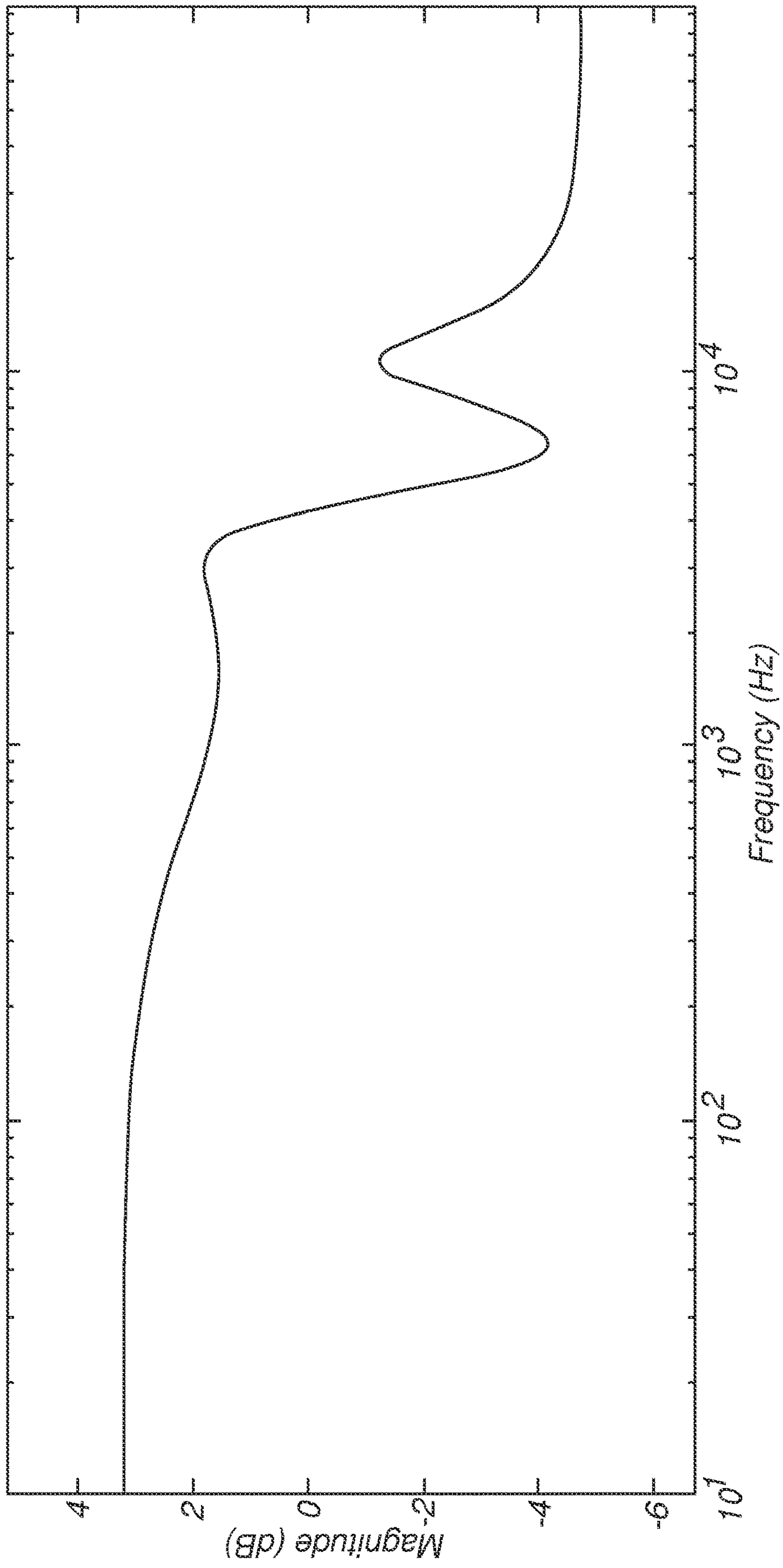
FIG. 3 illustrates the frequency response associated with sound location 2, sound path 6 in FIG. 2.

The frequency responses involved can be determined from readily available HRTF data. FIG. 3 shows the frequency response, as magnitude (dB) to frequency (Hz), associated with sound location 2, sound path 6 in FIG. 2.

Acoustic measurements have shown that sound waves do propagate around an object several times as described and it is quite audible and clear that when the second, third and fourth order HRTF are added the sound is perceived as more natural and the localization of the sound source is greatly improved. Localization and naturalness become better and better as more orders are added up to fourth order after which the improvement becomes less noticeable. Any order of HRTF can of course be used from second to as many as one can imagine, hundreds or even thousands but as stated orders above fourth only provide small benefits.

The sound paths starting with path 4 from the sound source to initially the left ear also has time delays, frequency responses and attenuations associated with each of them like the paths described above starting with path 3. The delay along 4 is however not zero as with path 3, it is delayed due to the interaural time difference. The frequency alteration that occurs would again typically be the well know average HRFR for the sound source location for the left ear. Attenuation along path 4 is typically 4.5 dB with the sound source located as shown in the example. The following second and third order paths 5 and subsequently 7 also have associated time delays, frequency responses and attenuations.

The sound path from one ear to the other across the front of the head is slightly longer than the path behind the head. It also produces a slightly different attenuation and frequency alteration than the sound path behind the head. Considering this it becomes obvious that the head and ears is an excellent localization device where different sound source locations would produce unique sets of Multiple Order HRTF sound paths. Consequently, Multiple Order HRTF makes it possible to achieve stable localization of sound sources both in front of and behind the head.

As Multiple Order HRTF separates the frequency response alteration, attenuation and time delay for each path averaging across test subjects become straight forward. Frequency responses for each path across many individuals can easily be averaged using familiar methods and attenuations and delays just become averages of attenuation and travel distances across test subjects for each path. Averaging of many individuals' properties is crucial to achieve stable and similar results for all listeners.

Figure 4:
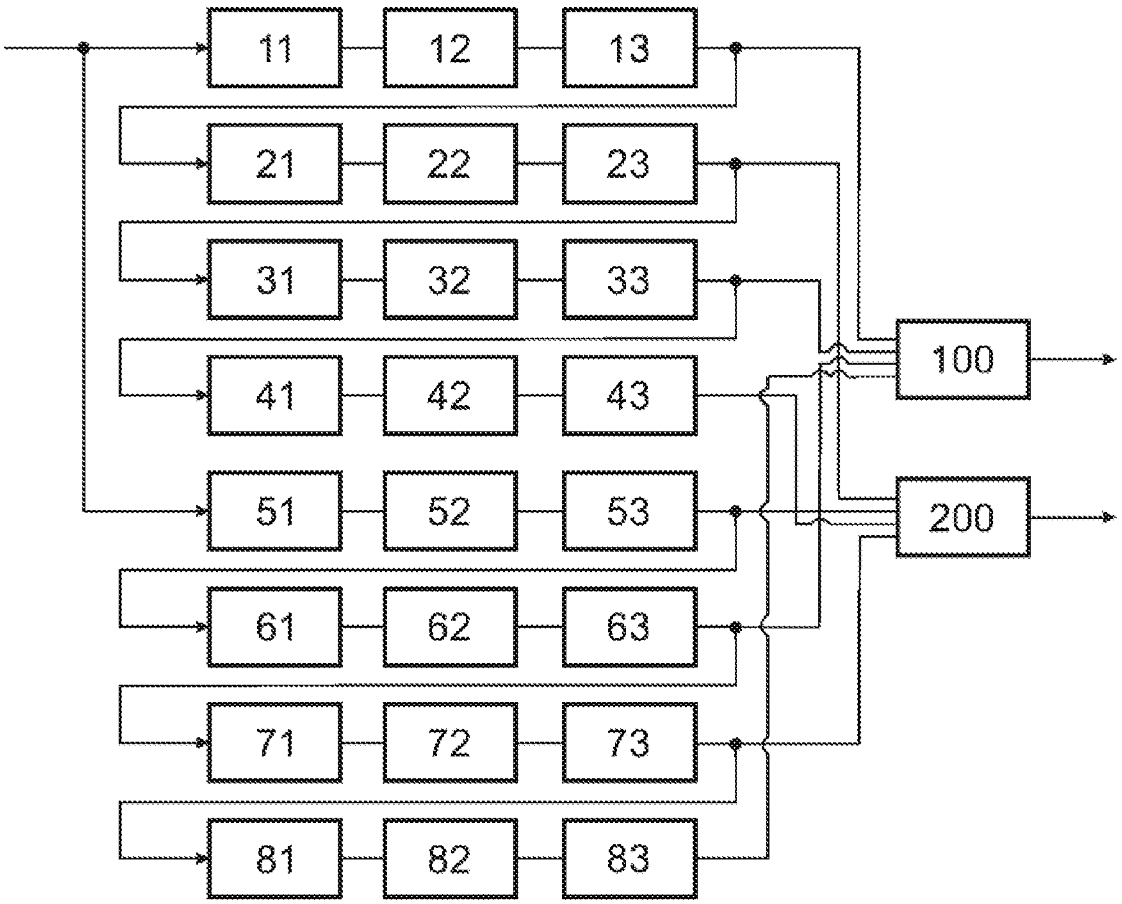
FIG. 4 is a block diagram of a Multiple Order HRTF DSP implementation.

The frequency alterations associated with each path can easily be implemented using standard IIR filters eliminating the latency associated with FIR filters. Multiple Order HRTF thus works without any introduction of latency making the approach well suited to virtual reality, gaming and any other application that requires zero or extremely low latency. FIG. 4 contains a block diagram of a typical Multiple Order HRTF DSP implementation. A fourth order implementation for one sound source position is shown. It is of course possible and obvious that one can implement Multiple Order HRTF in many other ways and FIG. 4 just shows an example of one of many possible topologies. Blocks 11, 21, 31, 41, 51, 61, 71 and 81 are delay blocks applying the delays associated with each set of four paths for each ear in the fourth order implementation. Block 12, 22, 32, 42, 52, 62, 72 and 82 apply the frequency alterations associated with each path. Block 13, 23, 33, 43, 53, 63, 73 and 83 are gain blocks applying attenuation present in each path. Finally, 100 is an adder block that is simply summing all outputs from the four paths to the left ear and 200 is the adder for the right ear. Outputs from 100 and 200 are sent to the respective left and right channels.

Applications utilizing Multiple Order HRTF can have both stereo and multichannel input signals. Multiple virtual sound sources can be created with Multiple Order HRTF. If the input signal is in an ordinary five channel surround sound format Multiple Order HRTF can be used to create five virtual speakers located in the usual positions of a five-channel surround sound setup i.e. front left and right, center and surround left and right. The discrete input channels are then played back by the corresponding virtual speaker. Similarly, more virtual speakers can be created for the latest surround sound formats involving more surround speakers and additional ceiling speakers. With a stereo input signal ordinary sound extraction and steering processes can be employed to extract the individual feeds to the virtual speakers. The stereo extraction and steering process would in this case be the same as in ordinary surround sound products.

The virtual sound sources created with Multiple Order HRTF works on both headphones and speakers. With headphones it is possible to create a surround sound field that approaches the experience using individually measured HRIR. On speakers it is possible to code virtual speakers into the direct sound from a pair of stereo speakers creating virtual center, surround and height speakers. With Multiple Order HRTF virtual speakers it is possible to create a surround sound field that is perceived to be similar to a setup with a multitude of speakers.

Playback using Multiple Order HRTF virtual sound sources is of course not limited to present day stereo or surround formats and their sound source locations. The examples above only illustrate possible Multiple Order HRTF applications and any number of virtual speakers in any position can of course be created as desired.

Multiple Order HRTF can be applied at any stage from sound recording/-generation to playback, it is not limited to the playback stage. It is possible to use Multiple Order HRTF in design and/or production applying locations to sounds using Multiple Order HRTF that can later be played back on headphones, an ordinary stereo or multichannel playback system. Multiple Order HRTF can as an example be used within a gaming engine to locate sound within the generated sound field of a game. Another example is the use of Multiple Order HRTF within DAW software, either integrated or as a plugin, to locate sound within a sound field in sound production. In other words, the Multiple Order HRTF algorithm and sound processing can be applied at any stage providing the same end result.

SPECIFIC EMBODIMENTS OF THE PRESENT INVENTION

Below some specific embodiments of the present invention are presented.

According to one specific embodiment of the present invention, the method comprises at least a third order HRTF going from the left ear to the right ear in the same way as from the right ear to the left ear, preferably at least a fourth order HRTF going from the left ear to the right ear in the same way as from the right ear to the left ear.

Moreover, according to another embodiment, said method comprising creating one or more virtual sound sources by embedding coded position information into the sound.

According to yet another embodiment, each head related transfer function (HRTF) from a second order and upwards comprises the parameters time delay, frequency response and attenuation.

Furthermore, according to another embodiment, the method takes into account the difference for different sound paths, e.g. the difference of the sound path from one ear to the other ear in front of the head and the sound path in back of the head. In this regard it should be noted that the sound paths from one ear to the other ear may be any path around the head. Therefore, the method according to the present invention may involve several sound paths.

Moreover, according to yet another embodiment, the method comprises averaging. As disclosed above, according to the present invention, averaging is possible to perform across individuals. With time domain coding there is provided a more stable localization of sound sources that is clearly positioned outside and in front, if desired, of the listener's head. Based on this, according to one embodiment of the present invention, the method comprises averaging being time domain focused. Furthermore, according to one embodiment of the present invention, the method comprises averaging of the parameters time delay, frequency response and attenuation independently of each other. This is yet a further difference when comparing to averaging performed in known methods used today.

The present invention is also directed to different types of systems, hardware and software implementations.

According to one embodiment, the present invention is directed to a headphone playback system arranged for using a method according to the present invention.

Furthermore, the present invention also refers to a speaker playback system arranged for using a method according to the present invention.

Moreover, the present invention is also directed to a playback system comprising a pair of stereo speakers, said system being arranged for using a method according to the present invention, for creating virtual surround sound sources around a listening room by embedding coded position information into the direct sound from the pair of stereo speakers.

Also other applications are possible according to the present invention, as clear from the description above.

According to one such embodiment, the present invention refers to a gaming engine system arranged for using a method according to the present invention. According to another embodiment, the present invention provides a digital audio workstation (DAW) software system arranged for using a method according to the present invention.

The invention claimed is:

1. A method for sound reproduction, said method comprising location coding with multiple order head related transfer functions (HRTF), wherein the method involves sound reproduction with at least a first order HRTF to the left ear and then a second order HRTF from the left ear to the right ear, and at the same time a first order HRTF to the right ear and then a second order HRTF from the right ear to the left ear.

2. The method according to claim 1, wherein the method comprises at least a third order HRTF going from the left ear to the right ear in the same way as from the right ear to the left ear, preferably at least a fourth order HRTF going from the left ear to the right ear in the same way as from the right ear to the left ear.

3. The method according to claim 1, said method comprising creating one or more virtual sound sources by embedding coded position information into the sound.

4. The method according to claim 1, wherein each head related transfer function (HRTF) from a second order and upwards comprises the parameters time delay, frequency response and attenuation.

5. The method according to claim 1, wherein the method takes into account the difference for different sound paths, e.g. the difference of the sound path from one ear to the other ear in front of the head and the sound path in back of the head.

6. The method according to claim 1, wherein the method comprises averaging.

7. The method according to claim 1, wherein the method comprises averaging of the parameters time delay, frequency response and attenuation independently of each other.

8. The method according to claim 1, wherein the method comprises averaging being time domain focused.

9. A headphone playback system, arranged for using a method according to claim 1.

10. A speaker playback system, arranged for using a method according to claim 1.

11. A playback system comprising a pair of stereo speakers, said system being arranged for using a method according to claim 1, for creating virtual surround sound sources around a listening room by embedding coded position information into the direct sound from the pair of stereo speakers.

12. A gaming engine system, arranged for using a method according to claim 1.

13. A digital audio workstation (DAW) software system, arranged for using a method according to claim 1.

* * * * *